United States Patent [19]

Uchida et al.

[11] Patent Number: 4,958,695
[45] Date of Patent: Sep. 25, 1990

[54] VARIABLE ASSIST POWER STEERING SYSTEM

[75] Inventors: Koh Uchida, Sagamihara; Takashi Kurihara, Atsugi, both of Japan

[73] Assignee: Nissan Motor Company, Limited, Yokohama, Japan

[21] Appl. No.: 138,479

[22] Filed: Dec. 28, 1987

[30] Foreign Application Priority Data

Dec. 27, 1986 [JP] Japan .................................. 61-313518

[51] Int. Cl.⁵ .............................................. B62D 5/83
[52] U.S. Cl. ...................................... 180/142; 60/494; 137/625.29; 180/143
[58] Field of Search ......................... 180/141–143, 180/132, 146, 149; 60/325, 459, 464, 494; 251/129.01, 304; 91/375 R; 137/47, 51, 569, 625.21, 625.23, 625.24, 625.28, 625.29, 625.31, 625.33, 625.34

[56] References Cited

U.S. PATENT DOCUMENTS

| | | | |
|---|---|---|---|
| 4,465,098 | 8/1984 | Bacardit | 137/625.21 |
| 4,512,238 | 4/1985 | Bacardit | 91/370 |
| 4,561,516 | 12/1985 | Bishop et al. | 180/142 |
| 4,561,521 | 12/1985 | Duffy | 180/142 |
| 4,565,115 | 1/1986 | Bacardit | 91/375 A |
| 4,570,735 | 2/1986 | Duffy | 180/142 |
| 4,619,339 | 10/1986 | Futaba et al. | 180/143 |
| 4,632,204 | 12/1986 | Honaga et al. | 180/142 |
| 4,665,798 | 5/1987 | Bacardit | 91/371 |
| 4,669,568 | 6/1987 | Kervagoret | 180/142 |
| 4,672,885 | 6/1987 | Kervagoret | 91/450 |

FOREIGN PATENT DOCUMENTS

| | | | |
|---|---|---|---|
| 0041887 | 12/1981 | European Pat. Off. . | |
| 53560 | 6/1982 | European Pat. Off. | 180/132 |
| 0112209 | 6/1984 | European Pat. Off. . | |
| 2568843 | 2/1986 | France . | |
| 47-30039 | 11/1972 | Japan . | |
| 54-15232 | 2/1979 | Japan . | |
| 56-38430 | 9/1981 | Japan . | |
| 56-174363 | 12/1981 | Japan . | |
| 57-30663 | 2/1982 | Japan . | |
| 58-156459 | 9/1983 | Japan . | |
| 161667 | 9/1983 | Japan | 180/142 |
| 1073 | 1/1985 | Japan | 180/142 |
| 61-43229 | 9/1986 | Japan . | |
| 257365 | 11/1986 | Japan | 180/141 |

Primary Examiner—John A. Pekar
Attorney, Agent, or Firm—Foley & Lardner, Schwartz, Jeffery, Schwaab, Mack, Blumenthal & Evans

[57] ABSTRACT

A control valve includes valve elements relatively displaceable in response to a predetermined variable (e.g., a steering torque) to define therebetween two parallel fluid flow paths connected between a fluid source and a fluid reservoir to produce pressure difference in a power cylinder. The control valve comprises a bypass path provided with a variable flow orifice that has an orifice area variable in response to said predetermined variable and an externally controlled variable flow orifice valve that has an orifice area variable in response to a second predetermined variable which is different from the first predetermined variable.

13 Claims, 12 Drawing Sheets

VARIABLE ASSIST POWER STEERING SYSTEM

RELATED APPLICATIONS

The following two U.S. patent applications have been already filed and assigned to the same assignee of the present application.

(1) U.S. patent application Ser. No. 044,065, filed on Apr. 29, 1987, now pending.

(2) U.S. patent application Ser. No. 102,412, filed on Sept. 29, 1987, now U.S. Pat. No. 4,771,841.

The following four U.S. patent applications have been concurrently filed and assigned to the same assignee of the present application.

(3) U.S. patent application Ser. No. 07/138,480, filed on Dec. 28, 1987, claiming priority based on Japanese Patent Application No. 61-313519 with a filing date of Dec. 27, 1986.

(4) U.S. patent application Ser. No. 07/138,490, filed Dec. 28, 1987, claiming priority based on Japanese Patent Application No. 61-313521 with a filing date of Dec. 27, 1986.

(5) U.S. patent application Ser. No. 07/138,402, filed on Dec. 28, 1987, claiming priority based on Japanese Patent Application No. 61-313520 with a filing date of Dec. 27, 1986.

(6) U.S. patent application Ser. No. 07/138,345, filed on Dec. 28, 1987, claiming priority based on Japanese Patent Application No. 61-313517 with a filing date of Dec. 27, 1986.

BACKGROUND OF THE INVENTION

The present invention relates to a variable assist power steering system for vehicles and more particularly to a hydraulic control valve for use in a variable assist power steering system where it is desirable to have the degree of power assistance change with vehicle speed or some other variable related to the mode of operation of the vehicle.

A power assisted steering system can be characterized as operating under three driving conditions. Firstly during straight ahead driving at medium to high speeds, the power requirements on the steering system are extremely low and the degree of power assistance provided by the steering gear should be correspondingly minimized to permit the feedback of road "feel" from the tires to the driver. Secondary during medium and high speed passing and cornering maneouvres, a progressive increase in the level of power assistance with driver input torque is desirable. Nevertheless moderate driver input torques should still be maintained in order that the driver can feel adequately the dynamic state of the vehicle. Thirdly, and lastly, during low speed or parking maneuvers, the power requirements on the steering system may be large and fidelity of the steering system in terms of transmitting road feel is of little importance. Under these circumstances it is generally desirable to offer large degrees of power assistance, thereby minimizing the input torque required to be furnished by the driver.

The demands for optimum valve characteristics during the above three driving conditions conflict. Attempts have been made in the past to avoid the conflicting demands of the first and third driving conditions, namely the need to achieve a low level assistance for high to medium speed on-center driving while having high levels of assistance for low speed and parking maneuvers, by exploiting the fact that, for most valves, the degree of assistance varies with the flow of oil. For example, in one such widely used system, the power steering pump is caused to reduce the flow of oil as vehicle speed increases. However, this adversely affects valve performance in the second driving condition above, namely medium to high speed passing and cornering maneuvers, where progressive valve response is impaired due to the low oil flow. Also, in the event that such a steering maneuver requires rapid turning of the steering wheel, the lower pump flow may be inadequate, rendering the power assistance momentarily inoperative. In another known system disclosed in JP 56-38430 B2, a bypass path with a variable flow valve is connected between both ends of the power cylinder and the variable flow valve is controlled in response to vehicle speed to cause bypass flow to increase as vehicle speed increases. However, this adversely affects valve performance in the second driving condition above, namely medium to high speed passing and cornering maneuvers, where progressive valve response is impaired due to the low gain.

The most satisfactory method of matching valve performance in all three of the abovementioned conditions is modulating the valve characteristic with vehicle speed. A system which provides for better modulation of power assistance with vehicle speed is disclosed in U.S. Pat. No. 4,561,521 and can be seen to employ a rotary valve with primary and secondary valve portions. A speed sensitive valve is used to control oil flow from the pump to the secondary valve portion so that at high vehicle speeds a parallel flow path is provided between the rotary valve and the pump as oil is distributed to both primary and secondary valve portions. At low vehicle speeds, the speed sensitive valve restricts the flow of oil from the pump to the secondary valve portion. During parking maneuvers, the primary valve portion acts alone in the normal manner and the secondary valve portion is vented and not fed with oil from the pump. A change from a high level of power assist to a low level of power assist, and conversely, is effected by a variable force solenoid which is used to establish a parallel flow path from the pump to the secondary valve portion through a variable flow orifice. A speed sensing module controls the solenoid to open and close a variable orifice valve thus providing gradual changes in the level of power assist as the vehicle speed changes. The rotary valve used in this power steering system includes a valve housing having a circular opening which receives a valve sleeve. Positioned within the valve sleeve is an inner valve. The inner valve is formed with a primary set of longitudinal grooves forming a primary valve section, and also with a secondary set of longitudinal grooves forming a secondary valve section. The primary and secondary sets of longitudinal grooves register with primary and secondary sets of internal grooves formed in the internal wall of the valve sleeve, respectively. The primary and secondary sets of internal grooves are difficult to machine and requires skilled labor because they have to be formed in the inner wall of the valve sleeve with high precision. This has caused increased production steps and manufacturing cost.

SUMMARY OF THE INVENTION

The object of the present invention is to improve a variable assist power steering system which is free from the problem noted above.

The specific object of the present invention is to provide a hydraulic fluid system for a variable assist power steering system which can be embodied with valve grooves easy to machine.

According to the present invention, a control valve includes valve elements relatively displaceable in response to a predetermined variable (e.g., a steering torque) to define therebetween two parallel fluid flow paths connected between a fluid source and a fluid reservoir to produce a pressure difference in a power cylinder, wherein the control valve comprises a bypass path provided with a variable flow orifice that has an orifice area variable in response to said predetermined variable and an externally controlled variable flow orifice valve that has an orifice area variable in response to a second predetermined variable which is different from the first predetermined variable.

In one form of the present invention, a control valve includes, as two relatively displaceable valve elements, an inner valve and a valve sleeve with a bore receiving the innner valve, wherein the valve sleeve has an inner wall formed with a set of three longitudinally extending inner grooves separated by lands, the inner valve has an outer wall formed with a set of two longitudinally extending main grooves which lie opposite the lands of the valve sleeve, respectively, and each of the main grooves overlaps the adjacent two inner grooves, when the inner valve is in a central rest position with regard to the valve sleeve.

The inner valve includes a set of two auxiliary grooves, each associated with one of the main grooves, and the two auxiliary grooves, overlap different two of the inner grooves when the inner valve is in the central rest position.

Each of the auxiliary grooves and the overlapping main groove form the variable flow orifice of the bypass path.

DETAILED DESCRIPTION OF THE INVENTION

Figure 1:
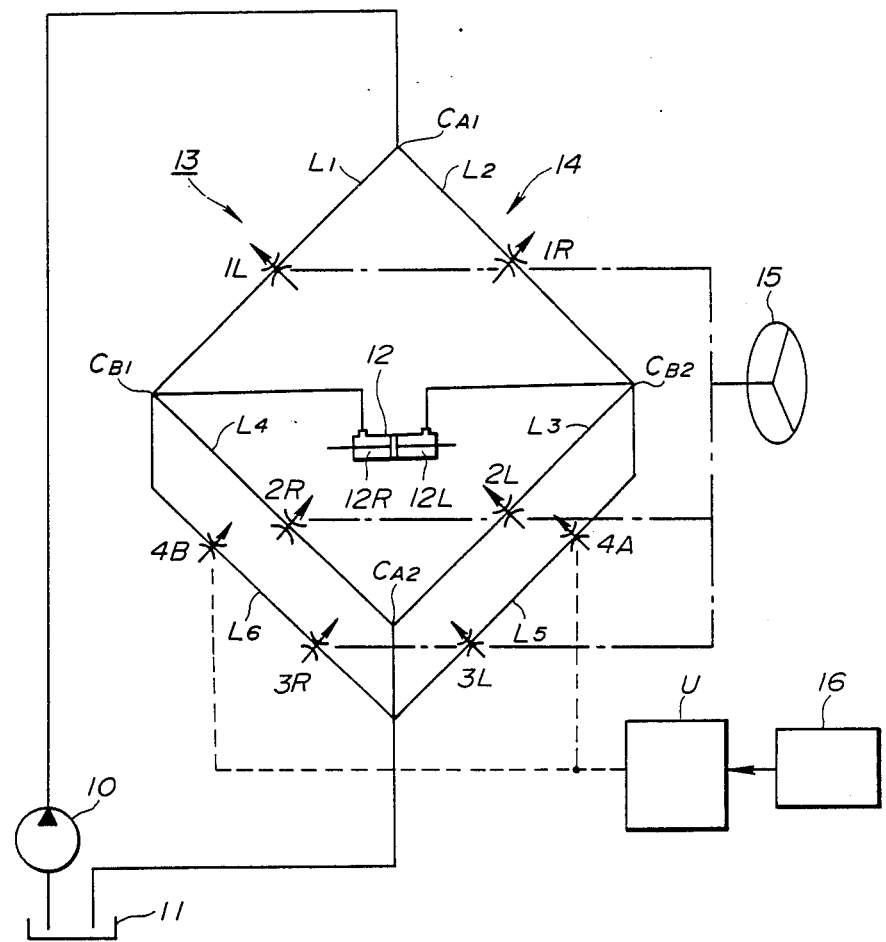
FIG. 1 is a circut diagram of a first embodiment of the present invention.

FIG. 1 shows a hydraulic fluid circuit diagram which includes an oil pump 10 as a hydraulic fluid source, a tank 11 as a fluid reservoir, and a control valve 13 employing a fluid flow distributor circuit 14 of the open center type. Also shown are a steering wheel 15, a vehicle speed sensor 16, and a control unit U.

In the conventional manner, the fluid flow distributor circuit 14 includes two parallel flow paths $L_2$–$L_3$ and $L_1$–$L_4$ connected between a pump fluid supply port $C_{A1}$ and a fluid return port $CA_2$. The flow path $L_2$–$L_3$ has a cylinder connection port $C_{B2}$ connected to a cylinder chamber 12L of a power cylinder 12, while the other flow path $L_1$–$L_4$ has a cylinder connection port $C_{B1}$ connected to a cylinder chamber 12R of the power cylinder 12. Arranged in the upstream portion $L_2$ and the downstream portion $L_3$ of the flow path $L_2$–$L_3$ are two variable flow orifices 1R and 2L, respectively. Similarly, arranged in the unstream portion $L_1$ and the downstream portion $L_4$ of the other flow path $L_1$–$L_4$ are two variable flow orifices 1L and 2R, respectively. These variable flow orifices 1R, 2L, 1L and 2R are operatively associated with the steering wheel such that when the steering wheel 15 is in the central rest position, they are opened to provide unrestricted parallel flows of fluid between the fluid supply port $C_{A1}$ and the fluid return port $C_{A2}$. Turning the steering wheel 15 clockwise from the central rest position causes the variable flow orifices 1R and 2R to decrease their orifice areas as steering torque increases with the other two variable flow orifices 1L and 2L kept opened, and turning the steering wheel 15 counterclockwise from the central rest position causes the variable flow orifices 1L and 2L to decrease their orifice areas as steering torque increases with the other two variable flow orifices 1R and 2R kept opened.

In order to vary flow of fluid passing through the flow path $L_2$–$L_3$, a bypass path $L_5$ is branched at the cylinder intermediate connection port $C_{B2}$ and leads to the tank 11. Similarly, in order to vary flow of fluid passing through the flow path $L_1$–$L_4$, a bypass path $L_6$ is branched at the cylinder connection $C_{B1}$ and leads to the tank 11. Thus, the bypass paths $L_5$ and $L_6$ are arranged in parallel to the variable flow orifices 2L and 2R, respectively. The bypass paths $L_5$ and $L_6$ include variable flow orifices 3L and 3R, respectively. Arranged in series with the variable flow orifices 3L and 3R are externally controlled variable flow orifice valves 4A and 4B, respectively, which are controlled by the control unit U. The variable flow orifices 3L and 3R are operatively associated with the steering wheel 15 such that they are opened when the steering wheel 15 is in the central rest position. Turning the steering wheel 15 clockwise from the central rest position causes the variable flow orifice 3R to decrease its orifice area as steering torque increases with the other variable flow orifice 3L kept opened. Turning the steering wheel 15 counterclockwise from the central rest position causes the variable flow orifice 3L to decrease its orifice area as the steering torque increases with the other variable flow orifice 3R kept opened.

Figure 2A:
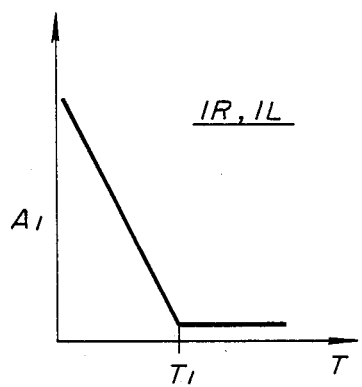
FIGS. 2(a) and 2(b) are diagrammatic charts showing how orifice areas of variable flow orifices vary against a steering input torque (T)
Figure 2B:
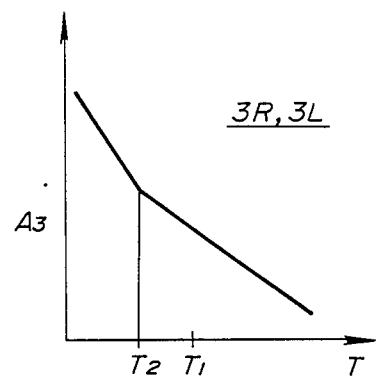
Figure 2C:
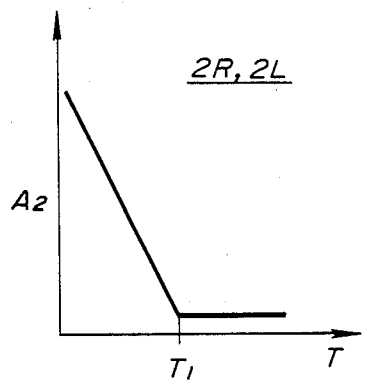
FIG. 2(c) is a diagrammatic chart showing how orifice area of variable flow orifice varies against steering torque.
Figure 2D:
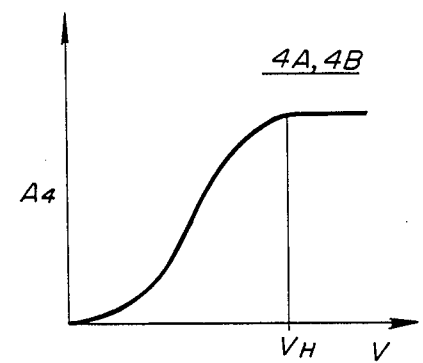
FIG. 2(d) is a diagrammatic chart showing how orifice area of externally controlled variable flow orifice valves varies against vehicle speed.

FIG. 2(a) shows how the orifice area ($A_1$) of the variable flow orifice 1R or 1L decreases as the steering torque (T) increases. FIG. 2(b) shows how the orifice area ($A_2$) of the variable flow orifice 2R or 2L decrease as the steering torque T increases. FIG. 2(c) shows how the orifice area ($A_3$) of the variable flow orifice 3R or 3L decreases as the steering torque increases. Lastly, FIG. 2(d) shows how the orifice area ($A_4$) of the externally controlled variable flow orifice valve 4A and 4B increases as vehicle speed (V) increases. The variation characteristics shown in FIGS. 2(a), 2(b), 2(c), and 2(d) will be referred to again later.

Referring to FIGS. 3 to 9, a rotary control valve 20 employing the fluid flow distributor circuit 14 is described.

The rotary valve 20 includes a valve housing 21 having a circular opening 21a which receives a valve sleeve 22 connected to a pinion which is adapted to engage a steering gear rack that in turn is connected to the steering gear linkages for the dirigible wheels of the vehicle. Positioned in the valve sleeve 22 is an inner valve 23. The inner valve 23 has an integral steering torque input shaft 23a externally splined and a central opening 23b which receives a torsion bar 24 having the right end pinned to the steering torque input shaft 23a. The left end of the torsion bar 24 is connected to the pinion.

Figure 4:
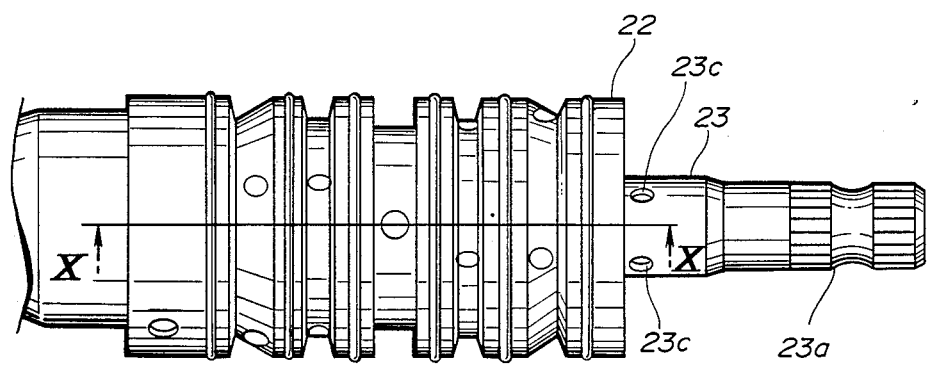
FIG. 4 is an elevation of a valve sleeve with an inner valve.
Figure 5:
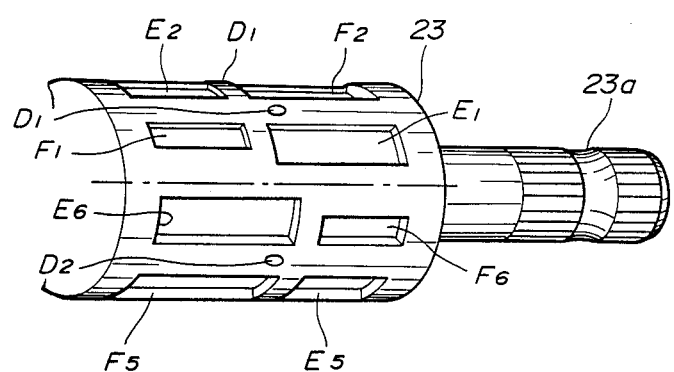
FIG. 5 is a perspective view of the inner valve.

FIG. 4 is a side elevation of the valve sleeve 22 with the inner valve 23 positioned therein, and FIG. 5 is a perspective view of the inner valve 23.

Figure 3:
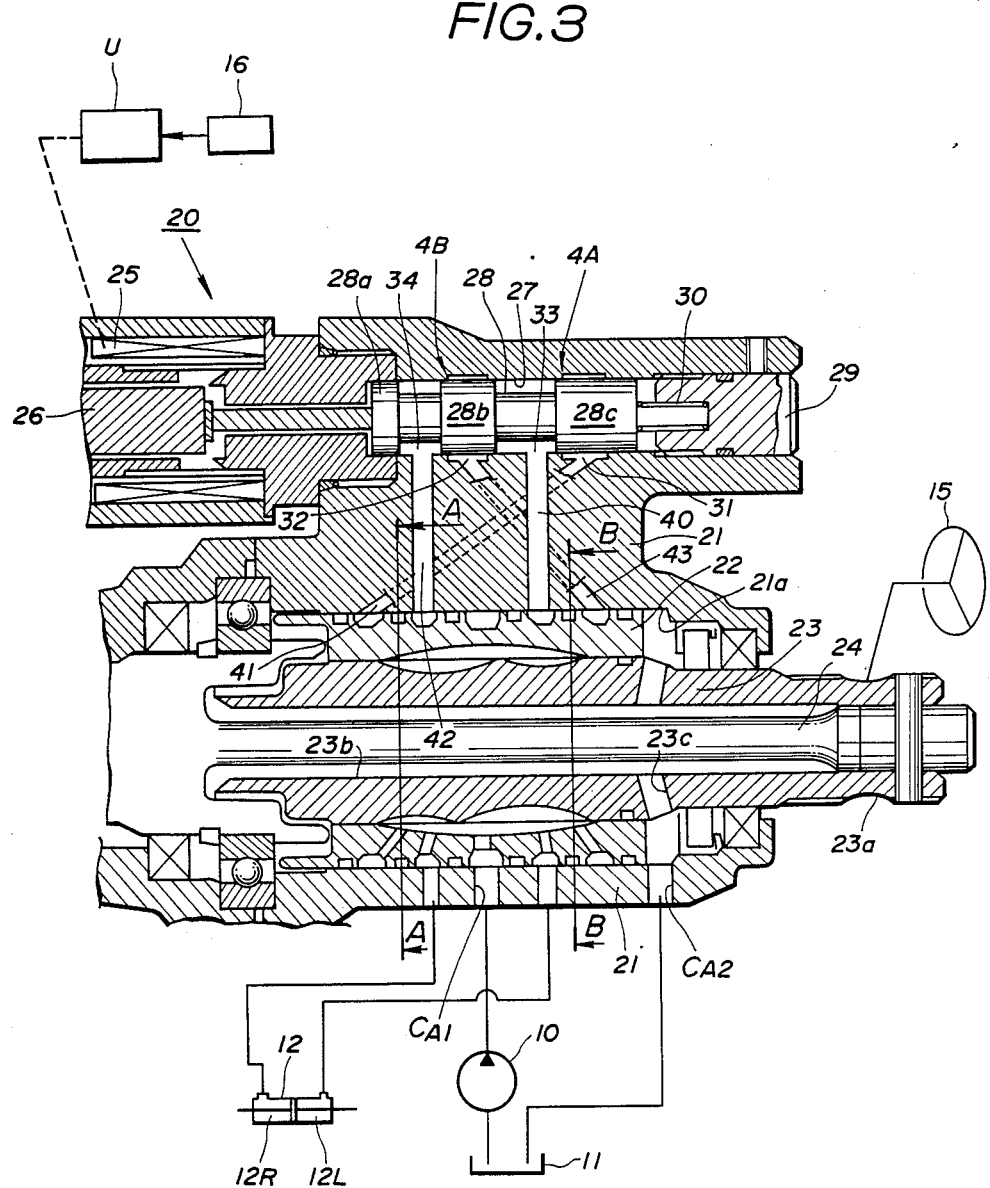
FIG. 3 is a fragmentary sectional diagram of a rotary control valve.
Figure 6:
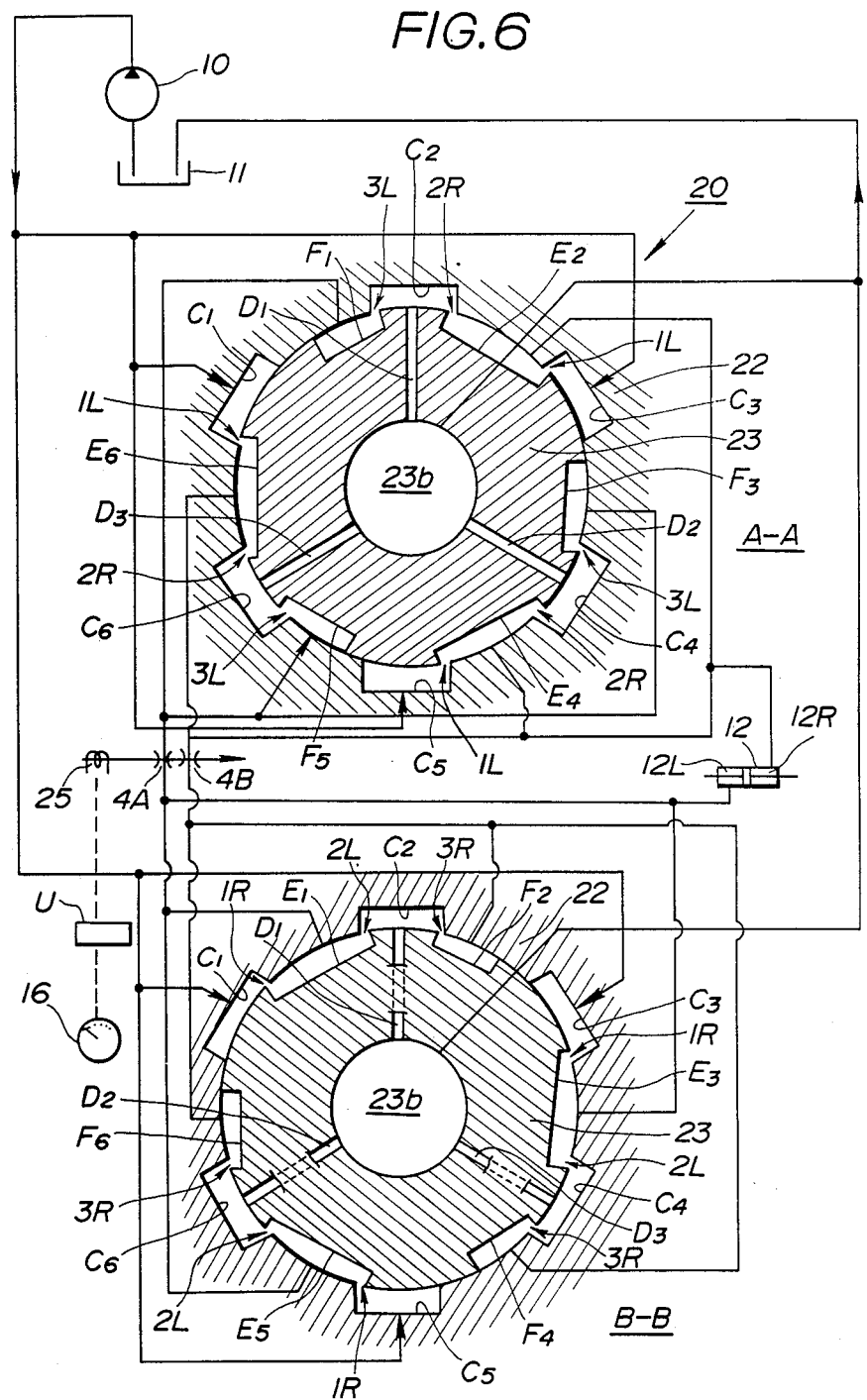
FIG. 6 is a circuit diagram including sections long the line A—A and B—B of FIG. 3.

FIG. 6 shows a cross section along the line A—A shown in FIG. 3 and a cross section along the line B—B shown in FIG. 3 which are diagrammatically circuited with the pump 10, the fluid reservoir 11, and the power cylinder 12.

Referring particularly to FIG. 6, formed in the cylindrical inner wall of the valve sleeve 22 are six longitudinally extending blind ended inner grooves $C_1$, $C_2$, $C_3$, $C_4$, $C_5$, and $C_6$ which are angularly spaced one after another and separated by lands. They are alternatively connected to the pump 10 and the fluid reservoir 11, namely the inner grooves $C_1$, $C_3$ and $C_5$ being connected to the pump 10, and the other three inner grooves $C_2$, $C_4$ and $C_6$ being connected to the fluid reservoir 11 via radial return passages $D_1$, $D_2$ and $D_3$, respectively.

Formed in the outer peripheral wall of the inner valve 23 are six longitudinally extending blind ended main grooves $E_1$, $E_2$, $E_3$, $E_4$, $E_5$ and $E_6$, each lying opposite one land separating the adjacent inner grooves of the valve sleeve 22. Among them, the three main grooves $E_1$, $E_3$ and $E_5$ face ports opening at the opposite lands of the valve sleeve 22, respectively, which ports are connected to the left chamber 12L of the power cylinder 12, while the other three main grooves $E_2$, $E_4$ and $E_6$ face ports opening at the opposite lands of the valve sleeve 22, respectively, which ports are connected to the right chamber 12R of the power cylinder 12. In the central rest position as illustrated in FIG. 6, the main groove $E_1$ overlaps the adjacent inner grooves $C_1$ and $C_2$, the main groove $E_2$ overlaps the adjacent inner grooves $C_3$ and $C_2$, the main groove $E_3$ overlaps the adjacent inner grooves $C_3$ and $C_4$, the main groove $E_4$ overlaps the inner grooves $C_5$ and $C_4$, and the main groove $E_6$ overlaps the inner groove $C_1$ and $C_6$, thus providing unrestricted balanced flow of fluid between fluid inlet inner grooves $C_1$, $C_3$ and $C_5$ and the radial return passages $D_1$, $D_2$ and $D_3$ drilled through the inner valve 23. The radial passages $D_1$, $D_2$ and $D_3$ communicate with the central opening 23b which is connected via radial bores 23c formed through the inner valve 23 and the port $C_{A2}$ to the fluid reservoir 11 (see FIG. 3).

As will be understood from FIG. 5, the three main grooves $E_1$, $E_3$ and $E_5$ are circumferentially alinged and disposed near one axial end of the inner valve 23, while the other three main grooves $E_2$, $E_4$ and $E_6$ which are circumferentially alinged are disposed near the opposite axial end of the inner valve 23. Formed also in the outer peripheral wall of the inner valve 23 are longitudinally extending auxiliary grooves $F_1$, $F_2$, $F_3$, $F_4$, $F_5$ and $F_6$. Among them, three auxiliary grooves $F_1$, $F_3$ and $F_5$ are axially separated from the main grooves $E_1$, $E_3$ and $E_5$, respectively, and disposed near the opposite end of the inner valve 23. The other three auxiliary grooves $F_2$, $F_4$ and $F_6$ are axially separated from the main grooves $E_2$, $E_4$ and $E_6$, respectively and disposed near the one end of the inner valve 23. In the central rest position as illustrated in FIG. 6, the auxliliary groove $F_1$ lies opposite the land that separates the inner grooves $C_1$ and $C_2$ of the valve sleeve 22 from each other and overlaps the inner groove $C_2$, the auxiliary groove $F_3$ lies opposite the land that separates the inner grooves $C_3$ and $C_4$ from each other and overlaps the inner groove $C_4$, and the auxiliary groove $F_5$ lies opposite the land that separates the inner grooves $C_5$ and $C_6$ from each other and overlaps the inner groove $C_6$. These auxiliary grooves $F_1$, $F_3$ and $F_5$ will not overlap the inner grooves $C_1$, $C_3$ and $C_5$, respectively, during normal operation of the rotary valve 20. They always face ports opening at the opposite lands of the valve sleeve 22, respectively, and via these ports and the associated lines, they are communicable with the main grooves $E_1$, $E_3$ and $E_5$ under the control of the externally controlled variable flow orifice valve 4A. Likewise, in the central rest position, the auxliliary groove $F_2$ lies opposite the land that separates the inner grooves $C_2$ and $C_3$ of the valve sleeve 22 from each other and overlaps the inner groove $C_2$, the auxiliary groove $F_4$ lies opposite the land that separates the inner grooves $C_4$ and $C_5$ from each other and overlaps the inner groove $C_4$, and the auxiliary groove $F_6$ lies opposite the land that separates the inner grooves $C_6$ and $C_1$ from each other and overlaps the inner groove $C_6$. These auxiliary grooves $F_2$, $F_4$ and $F_6$ will not overlap the inner grooves $C_3$, $C_5$ and $C_1$, respectively, during normal operation of the rotary valve 20. They always face ports opening at the opposite lands of the valve sleeve 22, respectively, and via these ports and the associated lines, they are communicable with the main grooves $E_2$, $E_4$ and $E_6$ under the control of the externally controlled variable flow orifice valve 4B.

Referring to FIG. 3, the construction of the externally controlled variable flow orifice valves 4A and 4B are explained. The valve housing 21 has a bore 27 receiving a spool 28 with three lands 28a, 28b and 28c. The bore 27 has two axially spaced annular grooves 31 and 42. One end of the bore 27 is sealably closed by an end plug 29 and a return spring 30 acts between the end plug 29 and the adjacent axial end of the land 28c. The spool 28 is urged by a plunger 26 surrounded by a solenoid 25 to move to the right as viewed in FIG. 3 against the action of the spring 30. In the illustrated spring set position, the land 28c covers the annular groove 31 and the land 28b covers the other annular groove 32. The normally covered annular groove 31 is associated with an always uncovered port 33, while the normally covered annular groove 32 is associated with an always uncovered port 34. Leading to the always uncovered port 33 is a radial passage 40 communicating with the main grooves $E_1$, $E_3$ and $E_5$ to receive fluid therefrom. Leading to the normally covered annular groove 31 is a passage 41 communicating with the auxiliary grooves $F_1$, $F_3$ and $F_5$. Leading to the always uncovered port 34 is a radial passage 42 communicating with the main grooves $E_2$, $E_4$ and $E_6$ to receive fluid therefrom. Leading to the normally covered annular groove 42 is a passage 41 communicating with the auxiliary grooves $F_1$, $F_3$ and $F_5$. As the vehicle speed V detected by the vehicle speed sensor 16 increases, the solenoid 25 under the control of the control unit U causes the plunger 26 to move the spool 28 to the right as viewed in FIG. 3 against the action of the spring 30. This rightward movement of the spool 28 causes the lands 28b and 28c to gradually uncover the ports 42 and 31, respectively, thus providing fluid flow communication from the radial passage 42 to the passage 43 and fluid flow communication from the radial passage 40 to the passage 41. Thus, the inner edge of the land 28c cooperates with the annular groove 31 to form the variable flow orifice valve 4A, while the inner edge of the land 28b cooperates with the annular groove 42 to form the variable flow orifice valve 4B.

Referring again to FIG. 6, it is explained how the variable flow orifices 1R, 1L, 2R and 2L are formed in the rotary valve 20. In this rotary valve 20, three sets of such variable flow orifices are formed. More specifically, three variable flow orifices 1R are formed between the mating edges of the main groove $E_1$ and the inner groove $C_1$, between the mating edges of the main groove $E_3$ and the inner groove $C_3$, and between the mating edges of the main groove $E_5$ and the inner groove $C_5$. Three variable flow orifices 1L are formed between the mating edges of the main groove $E_2$ and the inner groove $C_3$, between the mating edges of the main groove $E_4$ and the inner groove $C_5$, and between the mating edges of the main groove $E_6$ and the inner groove $C_1$. The three variable flow orifices 2R are formed between the mating edges of the main groove $E_2$ and the inner groove $C_2$, between the mating edges of the main groove $E_4$ and the inner groove $C_4$, and between the mating edges of the main groove $E_6$ and the inner groove $C_6$. The three variable flow orifices 2L are formed between the mating edges of the main groove $E_1$ and the inner groove $C_2$, between the mating edges of the main groove $E_3$ and the inner groove $C_4$, and between the mating edges of the main groove $E_5$ and the inner groove $C_6$. It will be appreciated that N sets of parallel flow paths $L_2$–$L_3$ and $L_1$–$L_4$ are formed with $2\times N$ numbers of longitudinally extending inner grooves formed in the cylindrical inner wall of the valve sleeve 22 and $2\times N$ numbers of longitudinally extending main grooves.

For modulating the valve characteristics, there are formed six longitudinally extending auxiliary grooves $F_1$ to $F_6$ each of which has one edge mating with the adjacent one of the edges of the inner grooves $C_2$, $C_4$ and $C_6$ to form three sets of variable flow orifices 3R and 3L. More specifically, the three variable flow orifices 3R are formed between the mating edges of the auxiliary groove $F_2$ and the inner groove $C_2$, between the mating edges of the auxiliary groove $F_4$ and the inner groove $C_4$, and between the mating edges of the auxiliary groove $F_6$ and the inner groove $C_6$. The three variable flow orifices 3L are formed between the mating edges of the auxiliary groove $F_1$ and the inner groove $C_2$, between the mating edges of the auxiliary groove $F_3$ and the inner groove $C_4$, and between the mating edges of the auxiliary groove $F_5$ and the inner groove $C_6$. It will now be understood that the three sets of variable flow orifices 3R and 3L required for modulation of the valve characteristics are formed by six auxiliary grooves formed in the outer peripheral wall of the inner valve 23 without increasing the number of inner grooves to be formed in the inner wall of the valve sleeve 22. Obviously, if N sets of bypass passages are required, the number of the auxiliary grooves to be formed in the outer peripheral wall of the inner valve 23 amounts to $2\times N$.

Figures 7, 8:
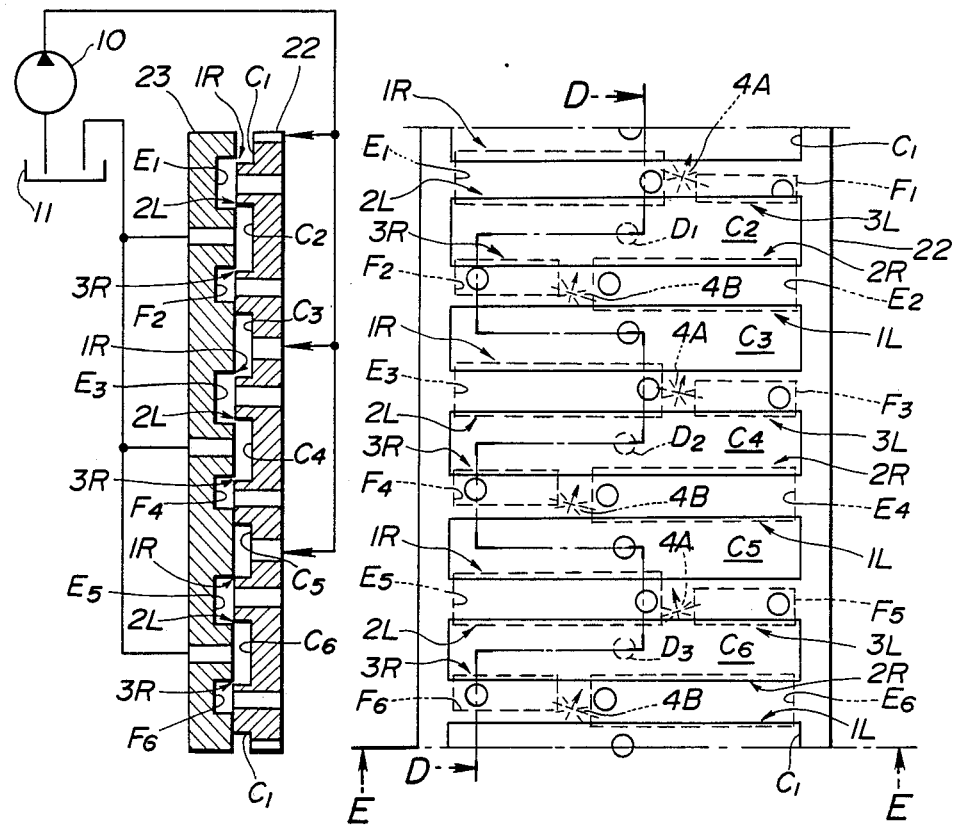
FIG. 7 is a diagram developed according to a longitudinal section X—X of FIG. 4.
FIG. 8 is a section along the line D—D of FIG. 7.
Figure 9:
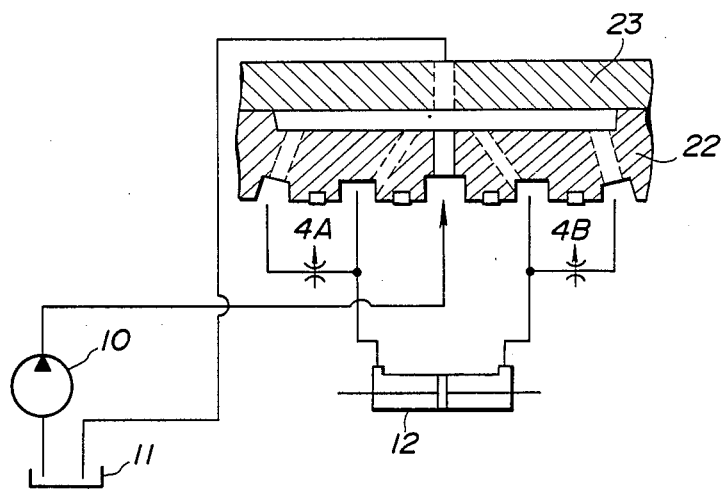
FIG. 9 is a section along the line E—E of FIG. 7.

Referring to FIGS. 7, 8 and 9, FIG. 7 is a diagram developed according to a longitudinal section X—X of FIG. 4 illustrating by solid lines the inner grooves $C_1$ to $C_6$ formed in the inner wall of the valve sleeve 22 in relation to the main grooves $E_1$ to $E_6$ and the auxiliary grooves $F_1$ to $F_6$ which are formed in the outer peripheral wall of the inner valve 23. FIG. 8 is a diagram cross sectioned along the line D—D of FIG. 7, and FIG. 9 is a diagram sectioned along the line E—E of FIG. 7.

In FIGS. 7 and 8, the rotary valve 20 is illustrated in its central neutral position. Under this condition, assuming that both of the externally controlled variable flow orifice valves 4A and 4B are fully closed when the vehicle speed is zero or substantially zero, fluid under pressure from the pump 10 is divided evenly through the variable flow orifices 1R and 2L in one direction and through the variable flow orifices 1L and 2R in the opposite direction. The pressure drops at the level of flow restrictions provided by these orifices are, under this condition, substantially nil. The rotary valve 20 thus has no effect on the power cylinder 12 and thus no effect on the steering system.

In the central rest position, assuming that both of the externally controlled variable flow orifice valves 4A and 4B are fully opened to provide the maximum orifice area thereof during operation of the vehicle at a sufficiently high speed (see FIG. 2(d)), fluid under pressure having past through the variable flow orifice 1R is divided through the variable flow orifice 2L in one direction and through the orifice valve 4A and the variable flow orifice 3L in the opposite direction, while the fluid under pressure having past through the variable flow orifice 1L is divided through the variable flow orifice 2R in one direction and through the orifice valve 4B and the variable flow orifice 3R in the opposite direction. The rotary valve 20 has, under this condition, no effect on the power cylinder 12 and thus no effect on the steering system.

During operation of the vehicle at intermediate speeds, the orifice areas of the variable flow orifice valves 4A and 4B vary in proportion to vehicle speed as shown in FIG. 2(d), the flow of fluid bypassing the variable flow orifice 2L or 2R increases as the vehicle speed increases. This, however, does not cause any pressure differential acting on both cylinder chambers 12L and 12R of the power cylinder 12, thus having no effect on the steering system.

Figure 10:
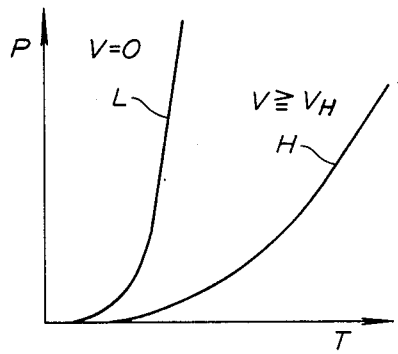
FIG. 10 is a chart showing power assist vs., steering torque characteristic curves for low vehicle and high vehicle speed.

In turning the steering wheel 15 at zero or substantially zero vehicle speeds, there is accordingly a relative displacement of the inner valve 23 with respect to the valve sleeve 22. In the case of a displacement of the inner valve 23 in FIG. 6 in a clockwise direction, e.g., towards the bottom in FIG. 8, the variable flow orifices 1R and 2R effect a throttling of the fluid path inducing a pressure drop which in turn results in a pressure increase in the right cylinder chamber 12R of the power cylinder 12. The variable flow orifices 2L open simultaneously proportionally and thus the left cylinder chamber 12L is in substantially in direct communication with the fluid reservoir 11. Thus, there is created between the right and left cylinder chambers 12R and 12L a pressure differential causing the rod of the power cylinder 12 to displace towards the left in FIG. 6. The variable flow orifice 3R effects a throttling of the fluid path simultaneously, but since the orifice valve 4B is closed when the vehicle speed is zero or substantially zero, this throttling effected by the variable flow orifice 3R has no effect on the creation of the pressure differential. The hydraulic pressure P applied to the right power cylinder chamber 12R (i.e., a power assist) against the displacement of the inner valve 23 (i.e., a steering torque T) at zero vehicle speed (V=0) is illustrated by a characteristic curve L in FIG. 10. The shape of the curve L represents high levels of power assist at zero vehicle speed. In dertermining the shape of this curve L, the orifice area ($A_2$) vs., steering torque (T) characteristic (see FIG. 2(b)) of the variable flow orifice 2R (or 2L) plays a major role.

If, on the contrary, the steering wheel 15 is turned to cause a relative displacement of the inner valve 23 in a counterclockwise direction in FIG. 6 at zero or substantially zero vehicle speeds, the variable flow orifices 1L and 2L effect a throttling of the fluid path inducing a pressure drop which in turn results in a pressure increase in the left cylinder chamber 12L of the power cylinder 12. The right cylinder chamber 12R is in direct communication with the fluid reservoir 11 via the variable flow orifices 2L which open simultaneously proportionally.

Let us now consider how the rotary valve 20 works at a high vehicle speed above a predetermined level $V_H$. The orifice area $A_4$ of the variable flow orifice valves 4A and 4B is maximum as shown in FIG. 2(d) regardless of variation of steering torque T. If the steering wheel 15 is turned clockwise during operation of the vehicle at such a high vehicle speed, there is accordingly a displacement of the inner valve 23 in a clockwise direction in FIG. 6, e.g., towards the bottom in FIG. 8, the variable flow orifices 1R, 2R and 3R effect a throttling of the fluid path flow orifices 2R inducing a less pressure drop which in turn results in a less pressure increase in the right chamber 12R of the power cylinder 12. The variable flow orifices 2L and 3L open simultaneously proportionally and thus the left cylinder chamber 12L is in substantially in direct communication with the fluid reservoir 11. Since the variable flow orifices 3R are in parallel to the variable flow orifices 2R, a pressure drop is less than a pressure drop induced by the variable flow orifices 2R alone and this results in a less pressure increase in the right cylinder chamber 12R with the same displacement of the inner valve 23. The increase of pressure P (i.e., a power assist) against steering torque T at vehicle speeds higher than $V_H$ is illustrated by a characteristic curve H in FIG. 10. As shown in FIG. 2(c), as steering torque T increases, the orifice area $A_3$ of the variable flow orifice 3R decreases at a rate less than a rate at which the orifice area $A_2$ decreases, and after the steering torque T has increased beyond a predetermined value $T_2$, the orifice area $A_3$ decreases at a further less rate. The shape of the characteristic curve H is determined by the variable flow orifice 3R in cooperation with the variable flow orifice 2R. Thus, any desired high vehicle speed power assist characteristic may be obtained by suitably designing the orifice varying characterstics of the variable flow orifice 3R.

In turning the steering wheel 15 during operation of the vehicle at an intermediate speed that is below the predetermined vehicle speed $V_H$, the variable flor orifice valves 4A and 4B opens under the control of the control unit U supplied with the output of the vehicle speed sensor 16 to provide an orifice area corresponding to a vehicle speed detected. In the event of a clockwise turning of the steering wheel 15 and thus a clockwise displacement of the inner valve 23, the variable flow orifices 3R in series with the orifice valve 4B decrease their orifice areas and thus the serially connected variable flow orifices 3R and 4B effect a throttling of fluid path bypassing the variable flow orifices 2R modulating a pressure increase, in the right cylinder chamber 12R, resulted from a pressure drop induced by a throttling of the fluid path effected by the variable flow orifices drop. The manner of modulation is such that with the same steering torque, the hydraulic fluid pressure in the cylinder chamber of the power cylinder 12 or power assist decreases as the vehicle speed increases, and at the same vehicle speed, the power assist increases as the steering torque increases. Thus, the power assist characteristic curves at intermediate vehicle speeds can be drawn between the two characterstic curves L and H in FIG. 10 and thus the power assist gradually decreases as the vehicle speed increases even though sufficient power assist is secured in response to a relatively large steering torque.

Figure 11:
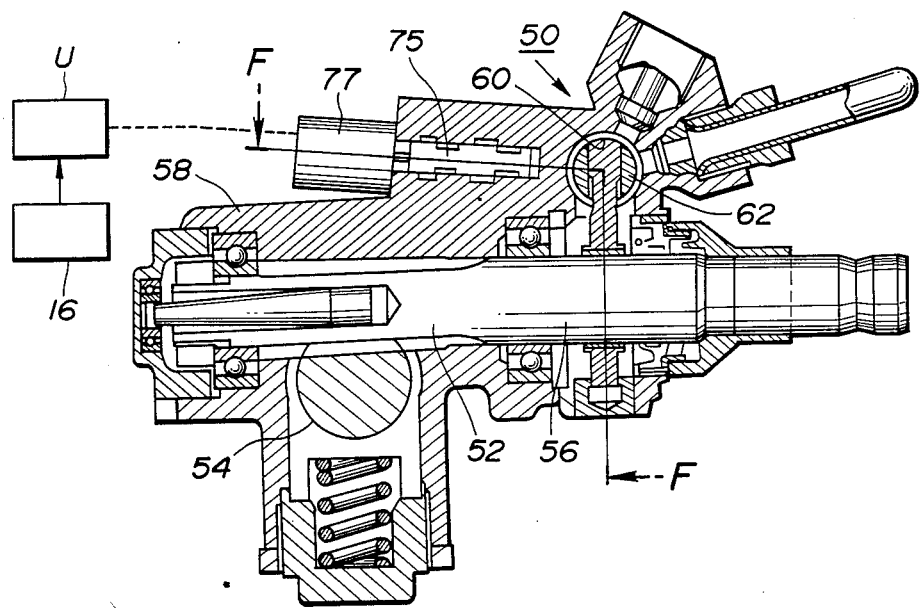
FIG. 11 is a sectional diagram of a spool type control valve.
Figure 12:
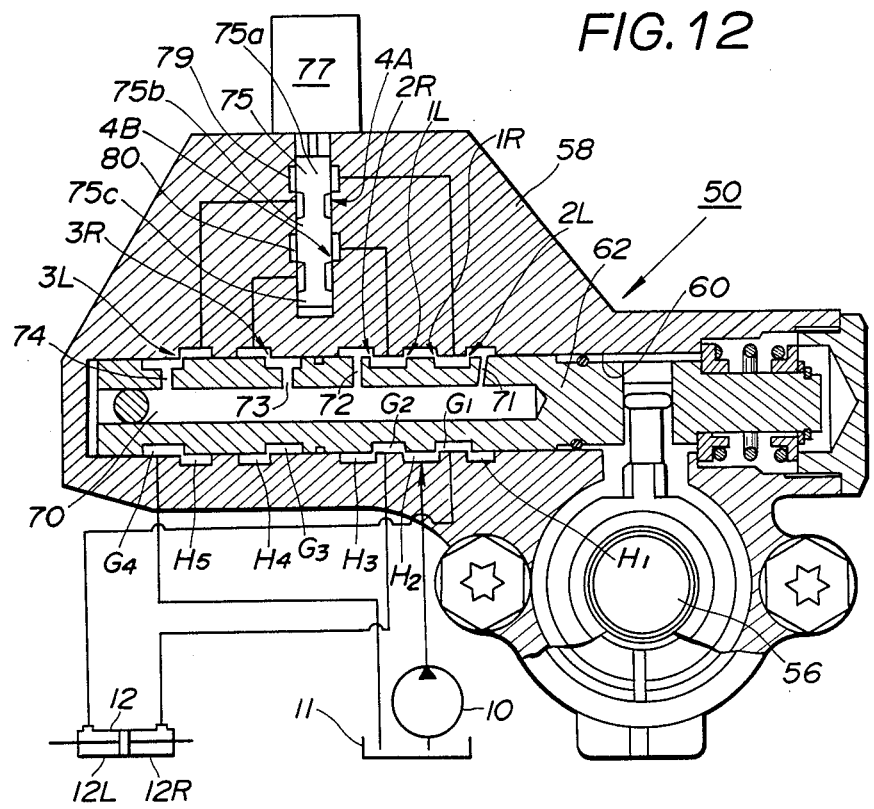
FIG. 12 is a section along the line F—F of FIG. 11.

Referring to FIGS. 11 and 12, there is shown a spool type control valve 50 embodying the distributor circuit 14 shown in FIG. 1. Reference numeral 52 designates a pinion 52 which engages a rack 54 of a steering system. The pinion 52 is formed at one end portion of a steering torque input shaft 56 that is rotatably supported in a housing 58. The housing 58 includes a valve bore 60 receiving a valve spool 62. In FIG. 12, the spool 62 displaces longitudinally as the steering input shaft 56 displaces from the illustrated central rest position angularly. For example, a clockwise displacement of the shaft 56 relative to the housing 58 causes a displacement of the spool 62 to the right relative to the bore 60. Formed in the inner wall of the valve bore 60 are a first set of three annular inner grooves $H_1$, $H_2$ and $H_3$ which are axially spaced and separated by two lands, and a second set of two annular inner grooves $H_4$ and $H_5$ which are axially spaced and separated by a land. Formed in the outer peripheral wall of the spool 62 are a pair of cicrumferentially extending main grooves $G_1$ and $G_2$ and a pair of circumferentially extending auxiliary grooves $G_3$ and $G_4$. These grooves $G_1$ to $G_4$ are spaced longitudinally and separated by lands. The spool 62 is formed with a blinded axial bore 70 and four radial passages 71, 72, 73 and 74 opening to the blinded axial bore 70. The inner groove $H_2$ is connected to a pump 10 to receive fluid under pressure. In the illustrated central rest position of the control valve 50, the land of the spool 62 separating the main grooves $G_1$ and $G_2$ lies opposite the inner groove $H_2$. The main groove $G_1$ overlaps the adjacent inner grooves $H_2$ and $H_1$, while the main groove $G_2$ overlaps the inner grooves $H_2$ and $H_3$. The mating edges of the main groove $G_1$ and the inner groove $H_1$ form a variable flow orifice 1R, while the mating edges of the main groove $G_2$ and the inner groove $H_2$ form a variable flow orifice 1L. The main groove $G_1$ lies opposite the land that separates the inner grooves $H_1$ and $H_2$ and connected to a left cylinder chamber 12L of a power cylinder 12, while the main groove $G_2$ lies opposite to the land that separates the inner grooves $H_2$ and $H_3$ and connected to a right cylinder 12R of the power cylinder 12. A variable flow orifice 2R is formed between the mating edges of the main groove $G_2$ and the inner groove $H_3$, while a variable flow orifice 2L is formed between the main groove $G_1$ and the inner groove $H_1$. Respectively via the radial passages 71 and 72, the inner grooves $H_1$ and $H_3$ are connected to the blinded axial bore 70 that in turn connected via the radial passage 74 and the inner groove $G_4$ to a fluid reservoir 11. The auxiliary groove $G_3$ overlaps the main groove $H_4$ and the auxiliary groove $G_4$ overlaps the inner groove $H_5$. The mating edges of the auxiliary groove $G_3$ and the inner groove $H_4$ form a variable flow orifice 3R, while the mating edges of the auxiliary groove $G_4$ and the inner groove $H_5$ form a variable flow orifice 3L. The variable flow orifices 1R, 1L, 2R, 2L, 3R and 3L have characteristics as shown in FIGS. 2(a), 2(b) and 2(c), respectively.

The valve housing 58 includes a bore receiving a spool 75 which is to be actuated by a solenoid operated actuator 77. This bore is formed with two annular grooves 79 and 80 which are connected to the main grooves $G_1$ and $G_2$, respectively. The spool 75 is formed with three lands 75a, 75b and 75c. In the rest position as illustrated in FIG. 12, the lands 75a and 75b cover the grooves 79 and 80, respectively. Formed between the lands 75a and 75b is a groove which is always connected to the inner groove $H_5$, while formed between the lands 75b and 75c is a groove which is always connected to the inner groove $H_4$. In FIG. 12, an upward displacement of the spool 75 by the solenoid actuator 77 causes externally controlled variable flow orifice valves 4A and 4B, which are formed between the mating edges of the land 75a and the groove 79 and between the mating edges of the land 75b and the groove 80, respectively, to open simultaneously proportionally. Under the control of a control unit U, the solenoid actuator 77 causes the spool 75 to displace upwardly as viewed in FIG. 12 proportionally to vehicle speed detected by a vehicle speed sensor 16. The externally controlled variable flow orifice valves 4A and 4B have characteristics as shown in FIG. 2(d).

Figure 13:
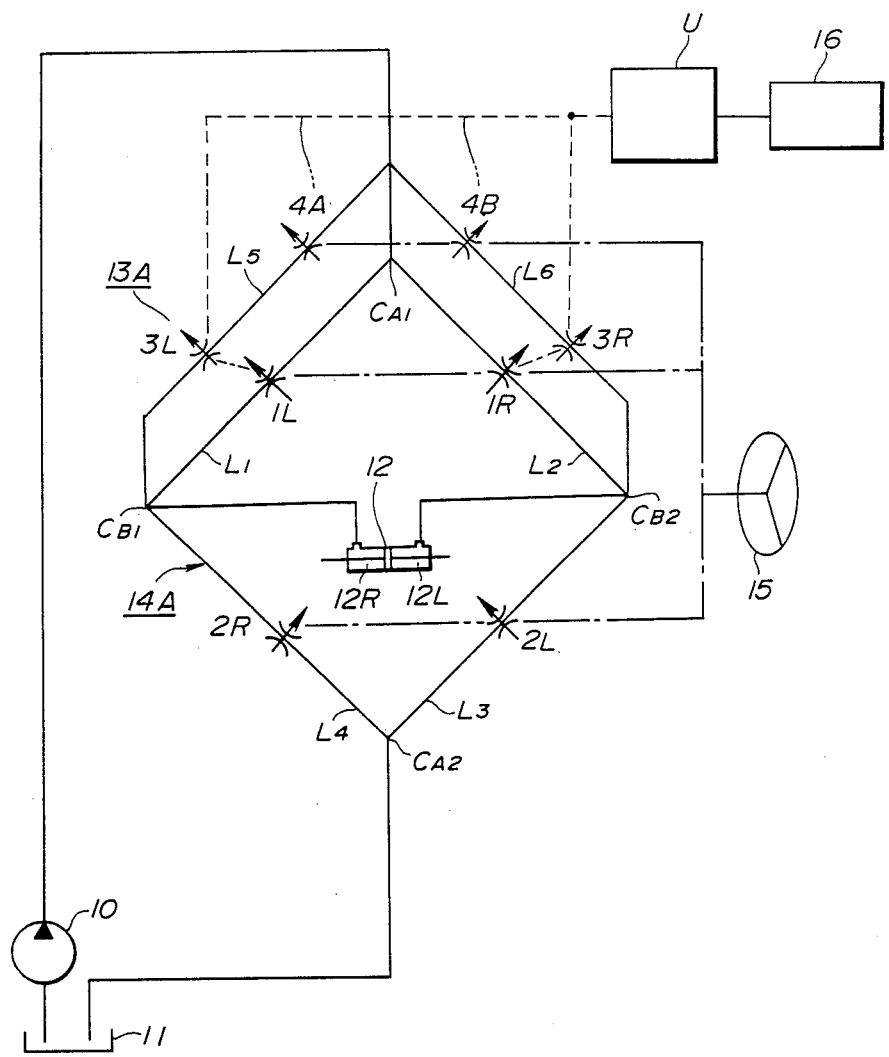
FIG. 13 is a circuit diagram of a second embodiment.

Referring to FIG. 13, a second embodiment of a control valve 13A employing a modified fluid flow distributor circuit 14A. In this Figure and FIG. 1, the same reference numerals are used to designate similar parts. Comparing FIG. 13 with FIG. 1, it will be readily understood that the fluid distributor circuit 14A is different from its counterpart shown in FIG. 1 in that a bypass path $L_6$, including an externally controlled variable flow orifice valve 4B and a variable flow orifice 3R is arranged in parallel to an upstream portion $L_2$ of one flow path $L_2$-$L_3$ and another bypass path $L_5$, including an externally controlled variable flow orifice valve 4A and a variable flow orifice 3L, is arranged in parallel to an upstream portion $L_1$ of the other flow path $L_1$-$L_4$. The operation and effects provided by this second embodiment are the same as those provided by the first embodiment.

Figure 14:
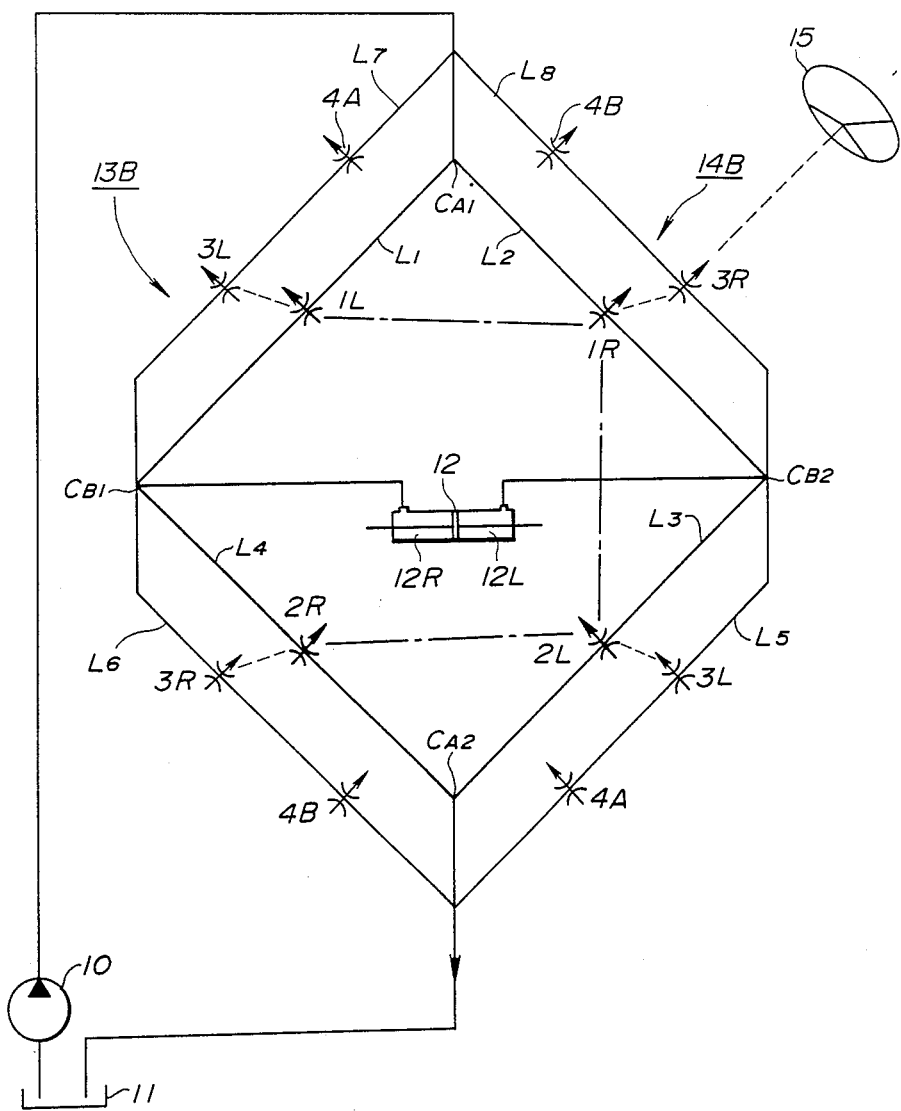
FIG. 14 is a circuit diagram of a third embodiment.

Referring to FIG. 14, a third embodiment of a control valve 13B employing a modified fluid flow distributor circuit 14B is described. The flow distributor circuit 14B is different from its counterpart shown in FIG. 1 in that there are additionally provided a bypass path $L_8$, including an externally controlled variable flow orifice valve 4B and a variable flow orifice 3R, as arranged in parallel to an upstream portion $L_2$ of one flow path $L_2$-$L_3$ and another bypass path $L_5$, including an externally controlled variable flow orifice valve 4A and a variable flow orifice 3L, as arranged in parallel to an upstream portion $L_1$ of the other flow path $L_1$-$L_4$. The operation and effects provided by this third embodiment are substantially the same as the first embodiment shown in FIG. 1.

In each of the fluid flow distributor circuits, the externally controlled variable flow orifice valve 4A (or 4B) is disposed upstream of the variable flow orifice 3L (or 3R) to effect a throttling of fluid flow passing through the bypass path $L_5$ or $L_7$ (or $L_6$ or $L_8$). Alternatively, the externally controlled variable flow orifice valve may be disposed downstream of the variable flow orifice.

In the previously described examples, vehicle speed is detected and used as a variable on which the control unit U controls electric current passing through the solenoid operated actuator for the externally controlled variable flow orifice valves 4A and 4B. More particularly, the externally controlled variable flow orifice valves 4A and 4B open simultaneously proportionally as vehicle speed increases.

If desired, the externally controlled orifice valves 4A and 4B may be controlled in response to some other variable related to a driver's preference or mode of operation of the vehicle.

Figure 15:
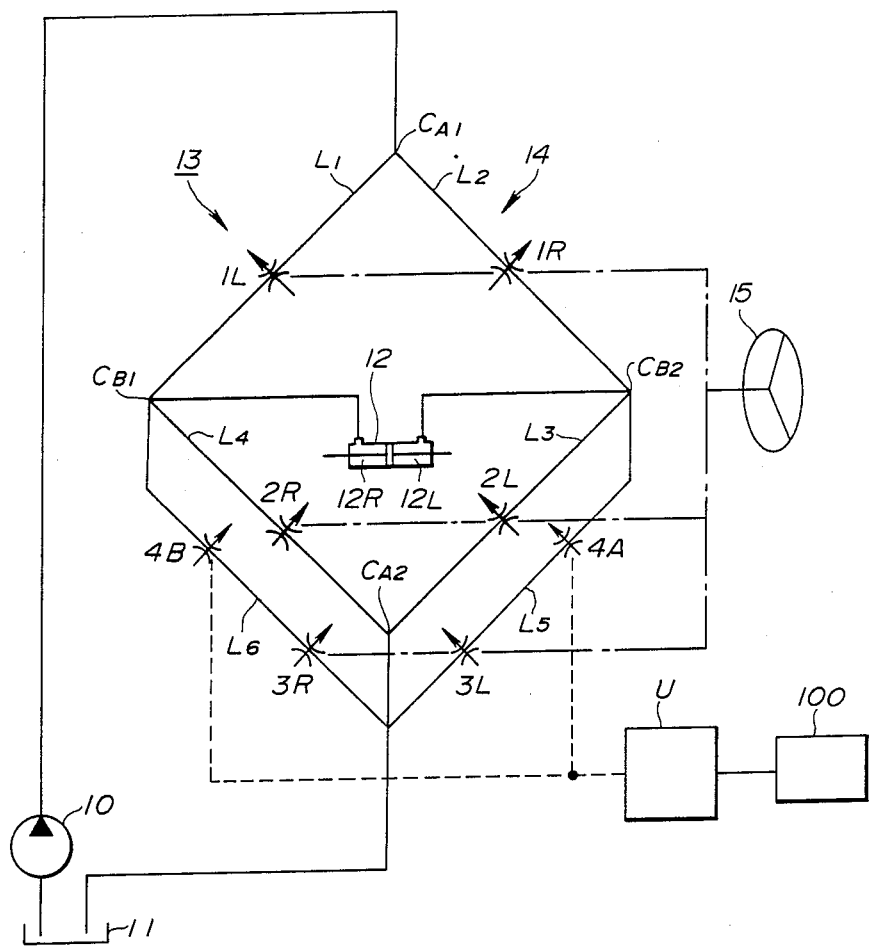
FIG. 15 is a circuit diagram of a modification of the first embodiment.

Referring to FIG. 15, a control unit U is supplied with the output of a manually operable selector 100 as different from the output of the vehicle speed sensor 16. The manually operable selector 100 includes a variable resistor and a rotary type switch arranged near the vehicle's driver. With the manual selector 100, the driver can vary electric current passing through a solenoid actuator for externally controlled variable flow orifices 4A and 4B so that the level of power assist can be adjusted until it fits the driver's preference.

Figure 16:
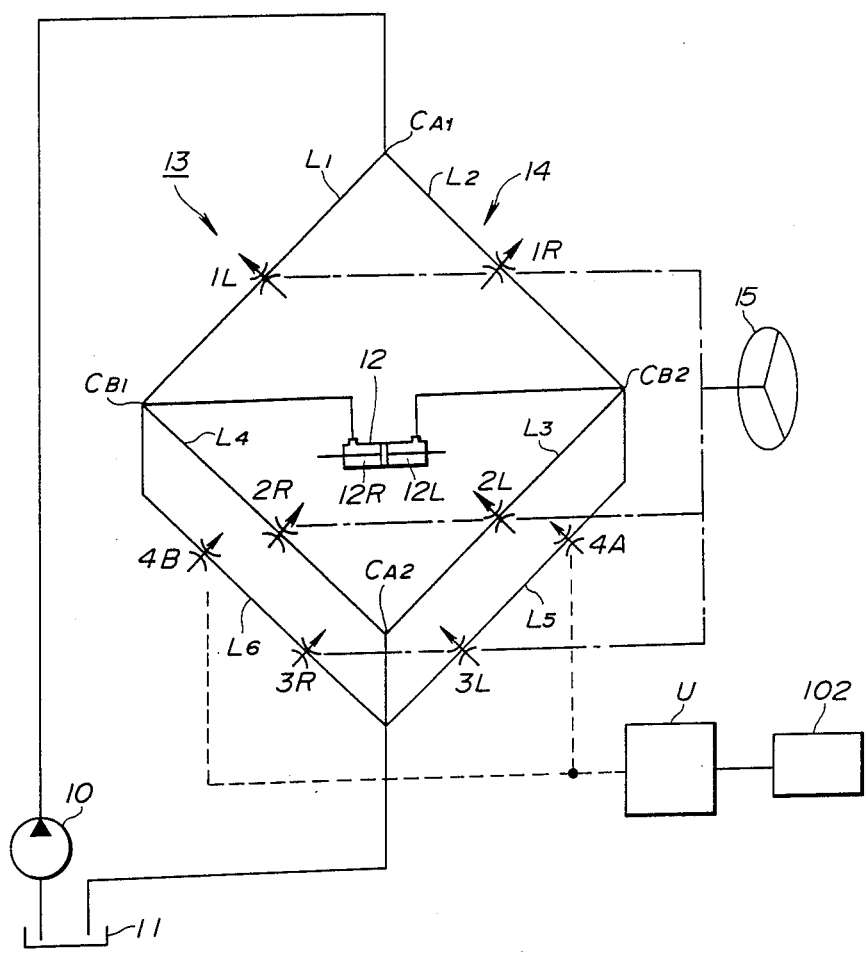
FIG. 16 is a circuit diagram of another modification of the first embodiment.

Referring to FIG. 16, a control unit U is supplied with the output of a road friction coefficient sensor 102. The control unit U can vary electric current passing through the solenoid actuator in accordance with friction coefficient detected by the sensor 102 such that the level of power assist vary in response to the friction coefficient detected by the sensor 102. One example of such a sensor is a switch coupled to a vehicle's wiper switch. In this case, the solenoid current increases as wiper speed increases, thus decreasing the level of power assist in response to wiper speed. This is advantageous because it is the common behaviour of a vehicle's driver to increase the wiper speed as rain fall gets heavier. A rain drop sensor may be used as a road friction coefficient sensor. It is possioble to detect road friction coefficient by computing a difference in rotation between a traction road wheel and a non traction road wheel or directly detect road friction coefficient by detecting the amount of splash by a traction road wheel. In using the above-mentioned sensors to detect road friction coefficient, it is also possible to modify solenoid current that is determined based on vehicle speed in response to the friction coefficient detected.

The solenoid current may be varied to modify the orifice area vs., vehicle speed characteristics shown in FIG. 2(b) in response to frequency of acceleration and deceleration which the vehicle is subject to. The solenoid current may be varied in accordance with judgement made based on steering wheel angle and speed at which the steering wheel is turned. Lastly, the solenoid current may be varied in response to load imposed on the vehicle drigible road wheels.

From the description regarding the fluid flow distributor circuits 14, 14A and 14B, it will be appreciated that each bypass path has one end connected to one of cylinder chambers of the power cylinder 12 without any flow restriction therebetween all of the fluid from the pump 10 is supplied to the power cylinder 12 over all modes of operation of the power steering. Thus, if a pump can discharge a fluid at a flow rate high enough to induce a sufficient power assist for turning a steering wheel at vehicle standstill, the shortage of supply of fluid will not take place in other modes of operation of the power steering.

What is claimed is:

1. A variable assist power steering system for vehicles including a hydraulic fluid source, a fluid reservoir, and a hydraulic pressure operated power cylinder adapted to be connected to a steering linkage, comprising:
a control valve including valve elements relatively displaceable in response to a predetermined variable to define therebetween two parallel fluid flow paths connected between the fluid source and the fluid reservoir to produce a pressure difference in the power cylinder in response to said predetermined variable,
wherein said control valve comprises a bypass path provided with a variable flow orifice that has an orifice area variable in response to said predetermined variable and an externally controlled variable flow orifice valve that has an orifice area variable in response to a second predetermined variable which is different from said predetermined variable wherein said bypass path has one end branched at an intermediate point in one of said parallel fluid paths and connected to the power cylinder and an opposite end connected to one of the fluid source and the fluid reservoir.

2. A variable assist power steering system as claimed in claim 1, wherein said variable flow orifice and said externally controlled variable flow orifice valve of said bypass path are connected in series.

3. A variable assist power steering system as claimed in claim 1, wherein said bypass path is arranged in parallel to a portion of each of said two parallel fluid flow paths.

4. A variable assist power steering system as claimed in claim 1, wherein said bypass path is arranged in parallel to at least a portion of each of said two parallel fluid flow paths and in series with the remaining portion of the corresponding fluid flow path.

5. A variable assist power steering system as claimed in claim 1, wherein said predetermined variable is a steering input torque and said second predetermined variable is vehicle speed.

6. A variable assist power steering system as claimed in claim 1, wherein said control valve comprises as said relatively displaceable valve elements an inner valve and a valve sleeve with a bore receiving said inner valve.

7. A variable assist power steering system as claimed in claim 6, wherein said valve sleeve has an inner wall formed with a set of three longitudinally extending inner grooves separated by lands, said inner valve has an outer wall formed with a set of two longitudinally extending main grooves which lies opposite said lands of said valve sleeve, respectively, and each of said main grooves overlaps the adjacent two inner grooves when said inner valve is in a central rest position with regard to said valve sleeve.

8. A variable assist power steering system as claimed in claim 7, wherein said inner valve includes a set of two auxiliary grooves, each associated with one of said main grooves, and said two auxiliary grooves overlap different two of said inner grooves when said inner valve is in the central rest position.

9. A variable assist power steering system as claimed in claim 8, wherein each of said auxiliary grooves and the overlapping main groove form said variable flow orifice of said bypass path.

10. A variable assist power steering system as claimed in claim 9, wherein said control valve has a valve housing including a bore receiving said valve sleeve, and a solenoid operated valve defining said externally controlled variable orifice valve, and said valve housing and said valve sleeve include passages connecting each of said auxiliary groove to said associated main groove via said externally controlled variable flow orifice valve.

11. A variable assist power steering system for vehicles including a hydraulic fluid source, a fluid reservoir, and a hydraulic pressure operated power cylinder adapted to be connected to a steering linkage, comprising:
a control valve including valve elements relatively displaceable in response to a predetermined variable to define therebetween two parallel fluid flow paths connected between the fluid source and the fluid reservoir to produce a pressure difference in the power cylinder in response to said predetermined variable; wherein
said valve elements define a first pair of main variable flow orifices, one disposed in a first of said two parallel fluid flow paths at an upstream portion between the hydraulic fluid source and the power cylinder and the other in a second of said two parallel fluid flow paths at a downstream portion between the power cylinder and the fluid reservoir, said valve elements also define a second pair of main variable flow orifices, one disposed in said second of said two parallel fluid flow paths at an upstream portion between the hydraulic fluid source and the power cylinder and the other in said first of said two parallel fluid flow paths at a downstream portion between the power cylinder and the fluid reservoir, said first pair of main variable flow orifices having orifice areas which are decreased as said valve elements relatively displace in one direction, said second pair of main variable flow orifices having orifice areas which are decreased as said valve elements relatively displace in an opposite direction; and wherein
said control valve comprises bypass paths, each being connected in parallel to one of said downstream portions of said two parallel fluid flow paths, each bypass path including an auxiliary variable flow orifice that has an orifice area which is variable in response to said predetermined variable and an externally controlled variable flow orifice valve connected in series with said auxiliary variable flow orifice, said externally controlled variable flow orifice having an orifice area which is variable in response to a second predetermined variable which is different from said predetermined variable.

12. A variable assist power steering system for vehicles including a hydraulic fluid source, a fluid reservoir, and a hydraulic pressure operated power cylinder adapted to be connected to a steering linkage, comprising:

a control valve including valve elements relatively displaceable in response to a predetermined variable to define therebetween two parallel fluid flow paths connected between the fluid source and the fluid reservoir to produce a pressure difference in the power cylinder in response to said predetermined variable; wherein said valve elements define a first pair of main variable flow orifices, one disposed in a first of said two parallel fluid flow paths at an upstream portion between the hydraulic fluid source and the power cylinder and the other in a second of said two parallel fluid flow paths at a downstream portion between the power cylinder and the fluid reservoir, said valve elements also define a second pair of main variable flow orifices, one disposed in said second of said two parallel fluid flow paths at an upstream portion between the hydraulic fluid source and the power cylinder and the other in said first of said two parallel fluid flow paths at a downstream portion between the power cylinder and the fluid reservoir, said first pair of main variable flow orifices having orifice areas which are decreased as said valve elements relatively displace in one direction, said second pair of main variable flow orifices having orifice areas which are decreased as said valve elements relatively displace in an opposite direction; and wherein said control valve comprises bypass paths, each being connected in parallel to one of said upstream portions of said two parallel fluid flow paths, each bypass path including an auxiliary variable flow orifice that has an orifice area which is variable in response to said predetermined variable and an externally controlled variable flow orifice valve connected in series with said auxiliary variable flow orifice, said externally controlled variable flow orifice having an orifice area which is variable in response to a second predetermined variable which is different from said predetermined variable.

13. A variable assist power steering system for vehicles including a hydraulic fluid source, a fluid reservoir, and a hydraulic pressure operated power cylinder adapted to be connected to a steering linkage, comprising:

a control valve including valve elements relatively displaceable in response to a predetermined variable to define therebetween two parallel fluid flow paths connected between the fluid source and the fluid reservoir to produce a pressure difference in the power cylinder in response to said predetermined variable; wherein said valve elements define a first pair of main variable flow orifices, one disposed in a first of said two parallel fluid flow paths at an upstream portion between the hydraulic fluid source and the power cylinder and the other in a second of said two parallel fluid flow paths at a downstream portion between the power cylinder and the fluid reservoir, said valve elements also define a second pair of main variable flow orifices, one disposed in said second of said two parallel fluid flow paths at an upstream portion between the hydraulic fluid source and the power cylinder and the other in said first of said two parallel fluid flow paths at a downstream portion between the power cylinder and the fluid reservoir, said first pair of main variable flow orifices having orifice areas which are decreased as said valve elements relatively displace in one direction, said second pair of main variable flow orifices having orifice areas which are decreased as said valve elements relatively displace in an opposite direction; and wherein said control valve comprises bypass paths, each being connected in parallel to one of said upstream and downstream portions of said two parallel fluid flow paths, each bypass path including an auxiliary variable flow orifice that has an orifice area which is variable in response to said predetermined variable and an externally controlled variable flow orifice valve connected in series with said auxiliary variable flow orifice, said externally controlled variable flow orifice having an orifice area which is variable in response to a second predetermined variable which is different from said predetermined variable.

* * * * *